May 10, 1949.  C. D. FLAGLE  2,469,375
DEICING APPARATUS FOR COMPRESSORS
Filed Sept. 24, 1945
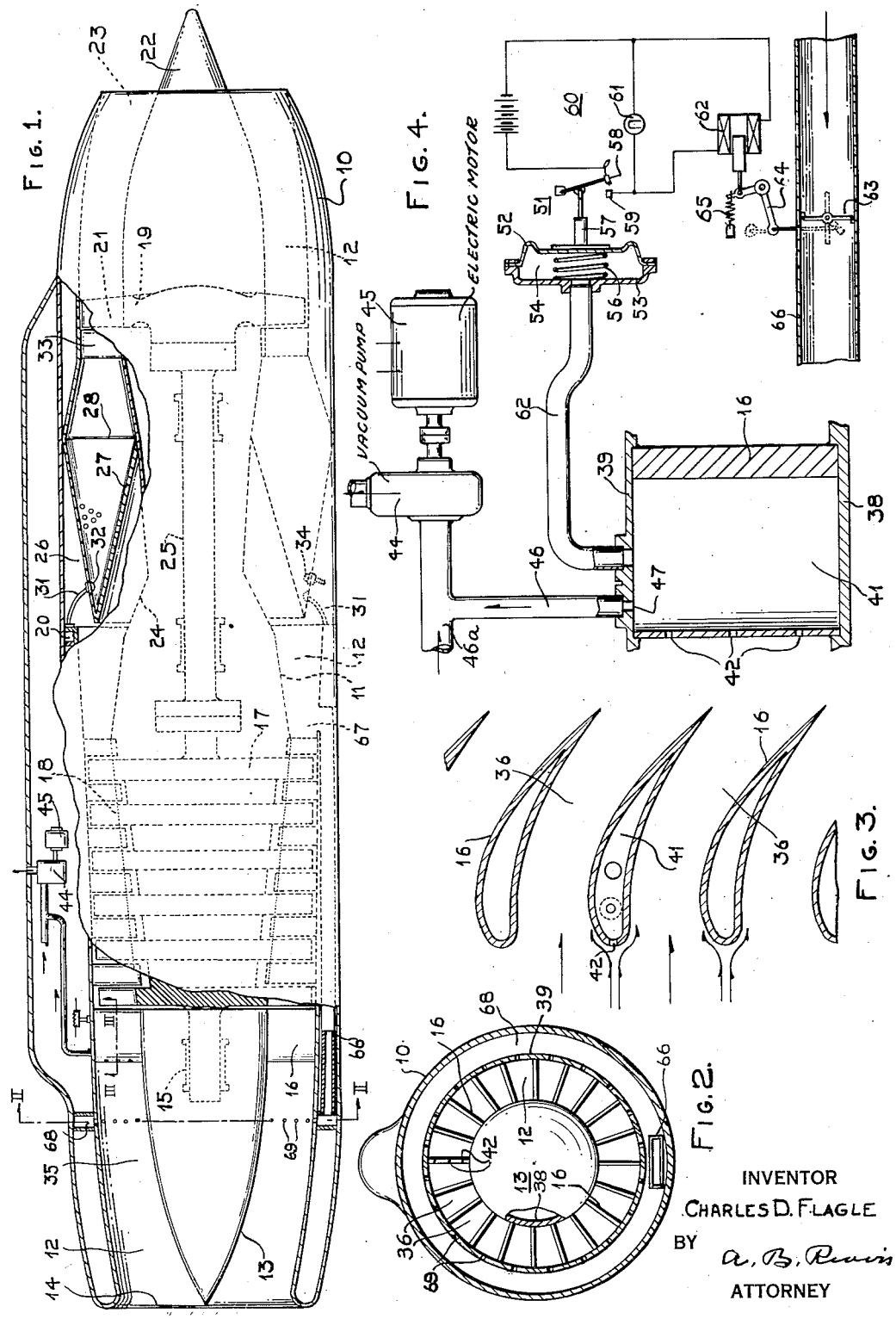
INVENTOR
CHARLES D. FLAGLE
BY
ATTORNEY Patented May 10, 1949

2,469,375

UNITED STATES PATENT OFFICE 2,469,375

DEICING APPARATUS FOR COMPRESSORS

Charles D. Flagle, Swarthmore, Pa., assignor to Westinghouse Electric Corporation, East Pittsburgh, Pa., a corporation of Pennsylvania Application September 24, 1945, Serial No. 618,140

5 Claims. (Cl. 230—1)

The invention relates to a power plant whose operation depends upon air supplied thereto from the atmosphere, and it has for an object to provide improved means responsive to the formation of ice at the air inlet either to give an indication thereof or to effect its removal.

The invention, while not limited thereto, is particularly adapted to be used to detect ice forming at the inlet of a gas turbine power plant like that disclosed in the copending application of Stewart Way, Serial No. 482,533, filed April 10, 1943 (now Patent No. 2,405,723, granted August 13, 1946) and assigned to the assignee of the present invention. Such a power plant includes an axial-flow air compressor, a gas turbine driving the compressor, combustion apparatus utilizing compressed air supplied thereto by the compressor to provide heated and compressed gases for operation of the turbine, and a nozzle utilizing gases exhausting from the turbine to provide a propulsion jet, all of these components being housed in line within a tubular casing. A plant of this character is particularly suitable for propelling aircraft at high speeds and it operates generally as follows: Air enters the forward end of the tubular casing for compression by the compressor; the compressed air is then heated in the heating or combustion apparatus by the combustion of fuel supported by the compressed air to provide motive fluid delivered to the turbine, which drives the compressor; and motive fluid issuing from the turbine is discharged through the propulsion nozzle as a jet, the reaction of which serves to propel the aircraft.

In the operation of a power plant of the above-mentioned type under adverse weather conditions, icing may occur at the forward end or compressor inlet. When ice forms at the inlet, the cross-sectional area of the latter is reduced, thus reducing the quantity of air flowing to the air heating apparatus. This reduction in air flow will diminish the thrust or power output; also, due to the fact that a reduced quantity of combustion and cooling air is flowing through the air heating apparatus, the exhaust gas temperature may rise to a dangerous degree, thereby causing damage to, or destruction of, the power plant.

In accordance with the present invention, I provide means which will detect ice forming at the air compressor inlet and will operate either to warn the pilot of the icing condition or to remove the ice therefrom, or both.

It is another object of the invention to provide an ice detector for a gas turbine power plant which is located at a point where icing is most likely to occur.

A further object of my invention is to provide an ice detector for a gas turbine power plant, which will not disturb the air flowing to the compressor.

These and other objects are effected by the invention as will be apparent from the following description and claims taken in connection with the accompanying drawings, forming a part of this application, in which:

Fig. 1 is a diagrammatic side elevational view of a gas turbine power plant in which the present invention has been incorporated, a portion of the outer casing structure being broken away to show details of construction;

Fig. 2 is a sectional view taken on the line II—II of Fig. 1, looking in the direction indicated by the arrows;

Fig. 3 is an enlarged sectional view taken along the line III—III of Fig. 1, showing the inlet guide vanes; and, Fig. 4 is an enlarged diagrammatic view showing the ice detector and associated apparatus.

Referring now to the drawings, the power plant shown in Fig. 1 comprises in general an outer tubular casing structure 10, open from end to end and having a central core 11 providing, with the casing, an annular flow passage 12, which, if the plant is to be used for propelling an airplane, is adapted to extend fore and aft with respect to the latter. The central core structure 11 is supported by the outer casing structure along its longitudinal axis and includes a hollow fairing cone 13 defining, with the forward or left end (Fig. 1) of the casing 10, an air inlet 14. The fairing cone 13 may be utilized to house a starter, gearing for driving auxiliary apparatus (not shown), and a front bearing 15, and it is supported from the casing 10 by a plurality of hollow compressor inlet guide vanes 16.

The core 11 also includes a rotor 17 of an axial-flow compressor 18, the fixed blades of which are carried by the casing 10, a rotor 19 of a gas turbine 21 and a longitudinally adjustable conical tailpiece 22 which defines, with the rear end of the casing 10, an adjustable propulsion nozzle 23.

The intermediate portion of the core structure between the compressor 18 and the turbine 21 comprises an inner tubular wall structure 24 which houses a shaft 25 connecting the turbine rotor 19 and compressor rotor 17. The inner wall structure 24 defines, with the casing 10, an annular chamber 26 connecting the compressor blade passage and the turbine blade passage.

The chamber 26 is provided with suitable air heating means, such as shown in the copending application of Stewart Way et al., Serial No. 511,468, filed November 23, 1943, for heating the air compressed by the compressor. In the embodiment herein shown, an annular, perforated, tapered burner tube 27 is mounted in the annular chamber 26 with its open end 28 directed downstream. Fuel is supplied to the burner tube 27 from a manifold 20, connected to a fuel supply (not shown) and is fed through branch pipes 31 to atomizing nozzles 32 extending into the burner tube. Suitable means, including spark plugs 34 extending into the burner tube, are provided for igniting the air-fuel mixture in the burner tube.

In operation, air enters the casing 10 at the inlet 14, is compressed by the compressor 18, and flows into the annular chamber 26, which may function as a diffuser to effect further compression. The compressed air then passes through the openings in the walls of the burner tube 27 and mixes with the atomized fuel supplied by the nozzles 32. The air and fuel mixture is ignited by the spark plugs 34 and burns steadily thereafter.

The motive fluid comprising the products of combustion and the excess air flows from the burner tube 27 and is directed by fixed guide vanes or nozzles 33 into the blade passage of the turbine rotor 19. The turbine 21 extracts at least sufficient energy from the motive fluid to drive the compressor 18 and other auxiliary apparatus. The spent gases leaving the turbine are discharged through the propulsion nozzle 23 at a high velocity so that the remaining available energy in the motive fluid is effective to propel the aircraft. The tailpiece 22 is preferably axially movable with respect to the casing 10 so that the back pressure on the turbine and the jet effect produced by the nozzle may be varied.

The present invention is concerned with means for detecting ice forming in the inlet of the gas turbine power plant and in particular for the detection of ice at the most vulnerable point of the inlet, that is, at the compressor inlet guide vanes 16.

The compressor inlet guide vanes 16 are disposed circumferentially in the forward or suction portion 35 of the annular flow path 12 and they define flow passages or spaces 36 for the flow of air therebetween. Such vanes accelerate and direct the incoming air in the proper direction, prior to entering the first stage of the compressor 18. As the guide vanes 16 have rounded inlet edges, they accommodate air entering over a fairly wide angle of approach and direct the leaving air for efficient utilization by the compressor blading. Since the air velocity increases as the flow area, defined by the passages 36 between the guide vanes, is reduced, the velocity increases toward the region where the maximum vane thickness occurs, that is, near the inlet edges; and, as increase in velocity is accompanied by reduction in temperature and pressure, icing is more likely to occur at the guide vane inlet edge region, and the provision of ice-detecting means at this location should anticipate icing on other parts of the inlet, thus giving ample notice of the first occurrence of this condition.

Accordingly, the ice detector utilizes the hollow interior of one or more of the inlet guide vanes 16, for the detection of ice forming thereon. Inner and outer supporting rings 38 and 39 for the guide vanes close the ends of the hollow guide vanes 16 to provide a pressure chamber 41. One or more inlet orifices or openings 42 are provided in the leading edge of the guide vane having the chamber 41 and a small portion of the air flowing to the compressor flows through the orifice or orifices 42 into the chamber. Referring to Fig. 3, it will be seen that the orifices 42 open into the air stream and will bleed off a metered quantity of air without obstructing or disturbing the air flowing to the compressor in any way.

A vacuum pump 44 may be driven in any suitable or well-known manner, for example, by the motor 45, and it serves to withdraw air entering the chamber 41 through the orifices 42. Accordingly, the vacuum pump has a suction conduit 46 which withdraws air continuously through an outlet opening or orifice 47 for the chamber 41. The orifice 47 has an effective area which is somewhat smaller than the total effective area of the inlet orifice or orifices 42; and, as long as the latter are unobstructed, the pressure in the chamber 41 will be slightly less than the pressure in the compressor inlet. However, if the orifice or orifices 42 should become obstructed or restricted, due to the formation of ice thereon, the ratio of the effective area of the outlet orifice 47 thereto becomes larger and the vacuum pump 44 will reduce the pressure in the chamber 41 to actuate a pressure-responsive switch 51.

Preferably, the suction conduit 46 has a branch 46a connecting with the usual relief valve (not shown) for preventing overloading of the vacuum pump 44 and motor 45 should ice formation completely close the openings 42.

The pressure-responsive switch 51 is, by way of example, provided with a movable diaphragm 52, which, with a casing 53, forms a collapsible chamber 54. A spring 56, disposed in the chamber 54, abuts the opposed walls 52 and 53 thereof and biases the former away from the latter. A rod 57, carried by the diaphragm, is connected to and actuates a movable contact 58, which engages a stationary contact 59 for energizing an electrical circuit 60, to be hereinafter described. The collapsible chamber 54 is placed in direct communication with the chamber 41 by a conduit 62. Thus the pressure in chamber 54 will be substantially the same as in the chamber 41. Under normal operation, the pressure prevailing in the chamber 54 is such that the spring 56 holds the movable contact 58 in open position. However, if the orifices 42 become obstructed, the vacuum pump 44 will reduce the pressure in the chambers 41 and 54, with the result that, due to this lowered pressure, the diaphragm 52 is moved against the force of the spring 56 to cause engagement of the contacts 58 and 59 to close the circuit 60.

The electrical circuit 60 includes a warning signal light 61, which, although not absolutely necessary, is preferably disposed so as to warn the pilot of the icing conditions, and it also includes a magnetic relay 62 for opening a valve 63 to supply hot gases to the passage 12 ahead of the vanes 16 to increase the temperature above freezing.

The relay 62 is disposed so as to open the valve 63, through a linkage system 64, when the relay is energized, and to allow the valve 63 to close under the influence of a spring 65 when the relay is deenergized. The valve 63 is disposed in a conduit 66 which provides for flow of heated air, preferably from the discharge end 67 of the compressor, to a header 68 disposed around the annular flow path 12 at the inlet of the compressor. A plurality of openings 69 are provided in the header 68 to discharge the heated air into the annular flow path 12 at a point ahead of the guide vanes 16. Thus, when the valve 63 is open, hot compressed air will flow through the conduit 66 to the distributing header 68 and will be discharged, through the openings 69, into the annular flow path, thereby adding heat to the incoming air and raising the inlet air temperature above the icing temperature, thus melting the ice adhering to the guide vanes.

Under normal operating conditions, the valve 63 is closed and does not permit the flow of heated air through the conduit 66 to the compressor inlet. To obtain the highest possible compressor efficiency, and consequently the highest thrust output, air entering the inlet 14 should be as cold as possible, and if heated air were supplied continuously to the compressor inlet 14, the total efficiency of the power plant would be reduced. However, during periods when icing does occur, removal of the ice from the inlet guide vanes 16 is more important than avoiding the slight overall drop in efficiency caused by the heated air entering the compressor.

Under normal non-icing conditions, a small portion of the air flowing to and around the inlet guide vanes 16 passes through the orifice or orifices 42 into the chamber 41 from which air is continuously withdrawn through the outlet orifice 47 by the pump 44. As the effective area of the orifice 47 is slightly less than the total effective area of the orifice or orifices 42, the pressure in the chamber 41 will be slightly less than the pressure in the compressor inlet. As the diaphragm 52 is subject to the pressure prevailing in the chamber 41, the pressure-responsive switch 51 is adjusted to normally disengage the contacts 58 and 59 during slight pressure variations with free flow through the compressor inlet. Under the above conditions the electrical circuit 60 is not energized and, therefore, the de-icing apparatus is inoperative and the signal light 61 off.

Assuming atmospheric conditions such that icing occurs, the air, upon reaching the inlet guide vanes 16, accelerates and the slightly lower pressure caused thereby results in precipitation of moisture; and, with the temperature below freezing, moisture adheres to the inlet guide vanes 16 and freezes on the latter. If this condition persists, the moisture condensing and freezing on the guide vanes accumulates and gradually throttles the air flow to the power plant, with the resultant dangers previously mentioned.

As ice begins to form over the outer surfaces of the guide vanes 16, it will likewise form around and in the orifices 42, thus restricting the rate of flow therethrough. As the effective area of the orifices 42 begins to decrease, the effective area of the orifice 47 becomes relatively larger in relation thereto, and, in consequence of this, the vacuum pump withdraws more air from the chamber 41 than enters the latter through the orifices 42. As a result, the pressure in the chambers 41 and 52 is reduced, and the diaphragm 52 moves to engage the contacts 58 and 59 to energize the electrical circuit to open the valve 63 and preferably also to operate the warning signal 61. As the valve 63 opens, heated air will flow through the conduit 66 to the header 68 and discharge through the holes or openings 69 into the air stream. As the heated air mixes with the air entering the annular flow path, the temperature of the inlet air is increased to a value high enough to prevent further icing and also to melt the ice formation which has already accumulated on the guide vanes 16.

When the heated air has removed the ice from the guide vanes, the effective areas of the orifices 42 will increase to their original value, whereupon the volume of air entering the orifices 42 will become greater than the volume of air flowing out of the orifice 47, and due to this, the pressure in the chambers 41 and 52 will increase substantially to its original value, whereupon the spring 56 will move the diaphragm 52 to open the contacts 58 and 59 and deenergize the electrical circuit 60. This will shut off the signal light, thereby indicating to the pilot that the ice formation has been removed, and also to allow the valve 63 to be closed by the spring 65, after which the power plant operates in the usual manner.

It is to be understood that the electrical circuit may be arranged only to warn the pilot of the ice formation with the de-icing apparatus operated independently by the pilot, or that the warning signal may be eliminated and the de-icing apparatus automatically operated thereby without notifying the pilot. Also, if desired, a modulating control could be effected in that the valve 63 could be partially opened and closed under certain conditions.

An important advantage of my invention is that the ice detector is situated at the point where the air velocity is higher than at any other part of the compressor inlet, which is subjected to icing conditions, and will thereby anticipate icing. It will also, under certain air speed conditions, serve as a warning to the pilot to be on the alert for ice formations on other parts of the aircraft.

The above ice detector requires very little additional equipment, in that it utilizes, for the most part, already existing standard apparatus and requires no additional space.

It is to be understood that if the compressor inlet fairing cone 13 is provided with supporting struts, ahead of the inlet guide vanes, my ice-detecting means may be situated at this point with substantially the same results.

While the invention has been shown in but one form, it will be obvious to those skilled in the art that it is not so limited, but is susceptible of various changes and modifications without departing from the spirit thereof.

What is claimed is:

1. In an air compressor having a suction passage for supplying air thereto from the atmosphere and a plurality of inlet guide vanes disposed in said passage for directing air to said compressor, apparatus for detecting the formation of ice on said guide vanes due to freezing of moisture condensing from the atmosphere and comprising means including one of said guide vanes formed hollow to provide a chamber, an outlet orifice for said chamber, means for removing air from said chamber through said outlet orifice, an inlet orifice for supplying air from said suction passage to said chamber and subject to area restriction due to ice formation, and means operated in response to reduction in pressure in said chamber occasioned by said restriction of said inlet orifice for admitting heated fluid to said passage upstream of said guide vanes.

2. In an air compressor having a suction passage for supplying air thereto from the atmosphere and a plurality of inlet guide vanes disposed in said passage for directing air to said compressor, apparatus for detecting the formation of ice on said guide vanes due to freezing of moisture condensing from the atmosphere and comprising means including one of said guide vanes formed hollow to provide a chamber, an outlet orifice for said chamber, means for removing air from said chamber through said outlet orifice, an inlet orifice for supplying air from said suction passage to said chamber and subject to area restriction due to ice formation, means for supplying heat to the suction passage of the compressor to effect removal of ice and normally ineffective, and means responsive to reduction in pressure in the chamber occasioned by said restriction of the inlet orifice to render the last-named means effective.

3. In an air compressor having a suction passage for supplying air thereto from the atmosphere and a plurality of inlet guide vanes disposed in said passage for directing air to said compressor and subjected to icing, apparatus for detecting the formation of ice on said guide vanes due to freezing of moisture condensing from the atmosphere and comprising means including one of said guide vanes formed hollow to provide a pressure chamber, an outlet orifice for said chamber, means for removing air from said chamber through said outlet orifice, an inlet orifice for supplying a metered quantity of air from said suction passage to said pressure chamber and subject to area restriction due to ice formation, and said inlet orifice having a larger area than said outlet orifice, suction passage heating means, and means operative in response to reduction in pressure in said chamber occasioned by said restriction of said inlet orifice to render said heating means operative.

4. In an air compressor having a suction passage for supplying air thereto from the atmosphere and a plurality of inlet guide vanes disposed in said passage for directing air to said compressor and subjected to icing, apparatus for detecting and indicating the formation of ice on said guide vanes due to freezing of moisture condensing from the atmosphere and comprising means including at least one of said guide vanes being formed hollow to provide a pressure chamber, an inlet orifice for supplying a metered quantity of air from said suction passage to said chamber and subject to area restriction due to ice formation, an outlet orifice for said chamber and having a smaller effective area than the normal unrestricted effective area of said inlet orifice, means for removing air from said chamber through said outlet orifice, and a pressure-responsive mechanism operative in response to a predetermined low pressure in said chamber due to said restriction of said inlet orifice for indicating ice formation.

5. In an air compressor having a suction passage for supplying air thereto from the atmosphere and a plurality of inlet guide vanes disposed in said passage for directing air to said compressor and subject to icing, apparatus for indicating and de-icing the ice forming on said guide vanes due to freezing of moisture condensing from the atmosphere comprising means including at least one of said guide vanes being formed hollow to provide a pressure chamber, an inlet orifice for supplying a metered quantity of air from said suction passage to said chamber, and subject to area restriction due to ice formation, an outlet orifice for said chamber having a smaller effective area than the normal unrestricted effective area of said inlet orifice, a vacuum-producing means for continuously removing air from said chamber through said outlet orifice, a pressure-responsive mechanism connected to said chamber, means for supplying heated fluid to said guide vanes normally closed valve means for controlling the flow of said heated fluid to said guide vanes and a normally deenergized means for indicating icing of said guide vanes associated with said pressure-responsive mechanism, said mechanism being operative in response to a predetermined low pressure in said chamber due to said restriction of said inlet orifice for actuating said valve means in an opening direction to permit flow of heated fluid to said guide vanes and to energize said indicating means, and in response to a predetermined high pressure in said chamber due to de-icing of said guide vanes to deenergize said indicating means and permit closing of said valve means.

CHARLES D. FLAGLE.

REFERENCES CITED

The following references are of record in the file of this patent:

UNITED STATES PATENTS

| Number | Name | Date |
|---|---|---|
| 2,080,488 | Kimball | May 18, 1937 |
| 2,208,689 | Sulzman | July 23, 1940 |
| 2,388,574 | Cunningham | Jan. 4, 1944 |
| 2,355,014 | Schorn | Aug. 1, 1944 |
| 2,405,723 | Way | Aug. 13, 1946 |